United States Patent [19]

Koyama et al.

[11] Patent Number: 4,984,455
[45] Date of Patent: Jan. 15, 1991

[54] SYSTEM FOR DETECTING SPEED OF ENGINE FOR VEHICLE

[75] Inventors: Hiroshi Koyama; Masami Kondo; Hiroshi Kawahara, all of Higashimatsuyama, Japan

[73] Assignee: Diesel Kiki Co., Ltd., Tokyo, Japan

[21] Appl. No.: 503,844

[22] Filed: Apr. 3, 1990

[30] Foreign Application Priority Data

Apr. 6, 1989 [JP] Japan .................. 1-40009[U]

[51] Int. Cl.$^5$ .......................................... G01M 15/00
[52] U.S. Cl. .................................................. 73/118.1
[58] Field of Search ............... 73/118.1, 117.3; 364/424.01, 424.1, 426.04, 426.03, 440

[56] References Cited

U.S. PATENT DOCUMENTS

| | | | |
|---|---|---|---|
| 4,700,563 | 10/1987 | Iwata et al. | 73/118.1 |
| 4,740,898 | 4/1988 | McKee et al. | 364/426.01 |
| 4,757,449 | 7/1988 | Kurihara et al. | 364/424.1 |
| 4,928,242 | 5/1990 | Suzuki | 73/118.1 |

FOREIGN PATENT DOCUMENTS

| | | |
|---|---|---|
| 60-162959 | 8/1985 | Japan . |
| 61-232354 | 10/1986 | Japan . |
| 62-67243 | 3/1987 | Japan . |
| 63-57845 | 3/1988 | Japan . |

Primary Examiner—Robert Raevis
Attorney, Agent, or Firm—Fish & Richardson

[57] ABSTRACT

A system for detecting the speed of an engine for a vehicle calculates the engine speed in accordance with a signal which is outputted from a main rotation sensor in accordance with the operation of the engine. In case the main rotation sensor is subjected to malfunction, the engine speed is calculated using a back-up signal. Namely, an auxiliary rotation sensor detects the rotation of a portion of a power transmission device. When the above portion of the power transmission device is connected to an output shaft of the engine, the signal from the auxiliary rotation sensor is used as the back-up signal. When the two are disconnected from each other, a signal, representing the condition of the operation of an actuator for controlling the amount of supply of fuel to the engine, is used as the back-up signal.

4 Claims, 4 Drawing Sheets

SYSTEM FOR DETECTING SPEED OF ENGINE FOR VEHICLE

BACKGROUND OF THE INVENTION

This invention relates to a system for detecting the speed of an engine for a vehicle.

A vehicle includes an engine, a clutch, a transmission (gear box) and wheels. The clutch, the transmission and the wheels are connected to the engine in this order. The amount of supply of fuel to the engine is controlled by an actuator such as a stepping motor.

A controller comprising a microcomputer and so on is mounted on the vehicle. The controller serves to control the actuator for controlling the fuel supply amount. In the case where the vehicle is provided with an automatic transmission, the controller also serves to control actuators for driving the automatic transmission, the clutch, etc.

When the controller is to control, for example, the stepping motor so as to control the amount of supply of fuel to the engine, the actual engine speed is an indispensable information. Therefore, a rotation sensor is associated with an output shaft of the engine or a shaft always connected with the engine. The rotation sensor outputs pulses in accordance with the operation of the engine. The above controller calculates the actual engine speed in accordance with the above pulses.

However, when the rotation sensor is subjected to malfunction, the engine speed information is not obtained, and as a result the fuel supply control and other controls can not be carried out properly.

Japanese Laid-Open (Kokai) Patent Application No. 232354/86 discloses a controller provided with two rotation sensors for outputting pulses in accordance with the operation of the engine. One of the two rotation sensors is used as a main sensor for detecting the engine speed whereas the other is used as a back-up sensor. In this case, if the main sensor operates properly, the back-up sensor does not perform any practical function, and therefore is useless or impractical.

Japanese Laid-Open Patent Application No. 67243/87 discloses a rotation sensor connected to an input shaft or an output shaft of a transmission. Japanese Laid-Open Patent Application No. 57845/88 discloses an arrangement in which the relation between the rotational position of a stepping motor and the engine speed is constant when the engine is idling (that is, under no load). Japanese Laid-Open Patent Application No. 162959/85 discloses two rotation sensors for detecting the engine rotation. By checking the relationship of output signals of these two rotation sensors, malfunction of each sensor is detected.

SUMMARY OF THE INVENTION

It is an object of this invention to provide an engine speed detecting system in which information, produced by a rotation sensor of a power transmission system and means for detecting the condition of the operation of a fuel supply control actuator (such sensor and means are usually installed), is utilized as a back-up information, so as to ensure that the engine speed can be detected even when an engine rotation sensor is subjected to malfunction, without the use of additional impractical equipment.

According to the present invention, there is provided a system for detecting the speed of an engine for a vehicle, the vehicle comprising a clutch connected to an output shaft of the engine, a transmission connected to the clutch, wheels connected to the transmission, and an actuator for controlling the amount of supply of fuel to the engine, the vehicle including a power transmission device having an output side portion of the clutch and an input shaft and an output shaft of the transmission, the system comprising:

(a) a main rotation sensor for outputting a signal in accordance with the operation of the engine;

(b) an auxiliary rotation sensor for outputting a signal in accordance with the rotation of a portion of the power transmission device;

(c) connection condition detecting means for determining whether or not the output shaft of the engine is connected to the portion of the power transmission device;

(d) operation condition detecting means for detecting an operation condition of the actuator to output a signal representative thereof;

(e) malfunction detecting means for detecting malfunction of the main rotation sensor;

(f) main rotation speed calculating means for calculating the engine speed in accordance with the signal from the main rotation sensor;

(g) first back-up calculating means for calculating the engine speed in accordance with the signal from the auxiliary rotation sensor, when the malfunction detecting means detects malfunction of the main rotation sensor, and the connecting condition detecting means determines that the output shaft of the engine is substantially connected to the portion of the power transmission device; and (h) second back-up calculating means for calculating the engine speed in accordance with the signal outputted from the operation condition detecting means and representing the condition of the operation of the actuator, when the malfunction detecting means detects malfunction of the main rotation sensor, and the connecting condition detecting means determines that the output shaft of the engine is substantially disconnected from the portion of the power transmission device.

DESCRIPTION OF THE PREFERRED EMBODIMENT OF THE INVENTION

One preferred embodiment of the invention will now be described with reference to FIGS. 1 and 2.

Figure 1:
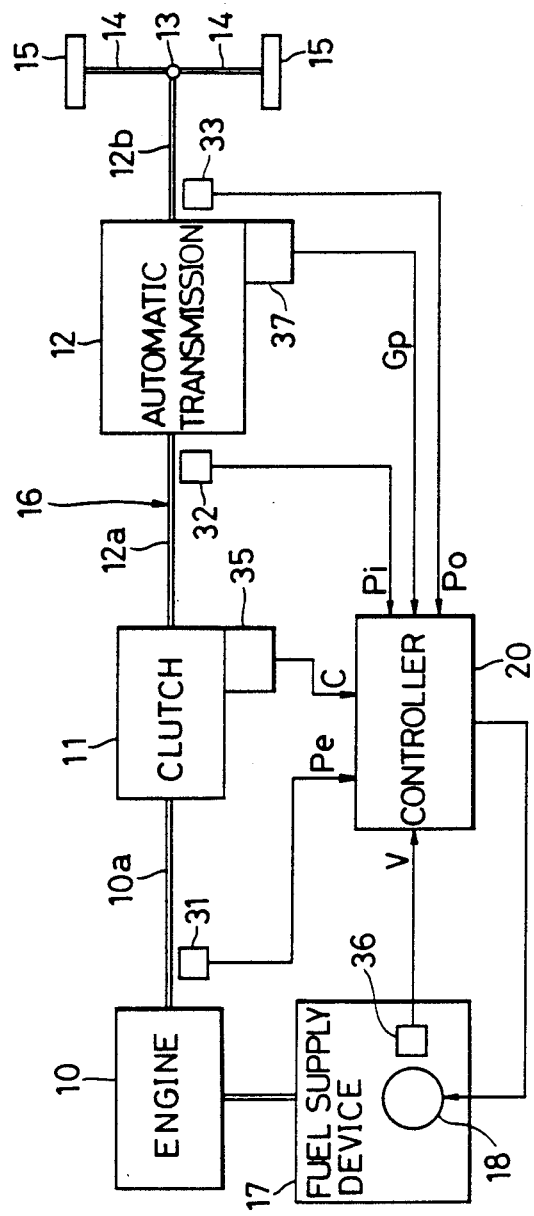
FIG. 1 is a block diagram of a general construction of a vehicle equipped with an automatic transmission.

As shown in FIG. 1, a vehicle comprises an engine 10, a clutch 11 connected to an output shaft 10a of the engine 10, an automatic transmission (gear box) 12 connected to the clutch 11, a differential gear 13 connected to the automatic transmission 12, axles 14 and 14 connected to the differential gear 13, and wheels 15 and 15 mounted on the axles 14 and 14, respectively. The automatic transmission 12 includes an input shaft 12a connected to the clutch 11, and an output shaft 12b connected to the differential gear 13. The output side of the clutch 11, the automatic transmission 12, the differential gear 13 and the axles 14 and 14 jointly constitute a power transmission system for transmitting the output of the engine to the wheels 15 and 15.

A fuel supply device 17 supplies fuel to the engine 10. The amount of supply of the fuel from the fuel supply device 17 is controlled by a control member (not shown) such as a throttle valve and a control lever. This control member is driven by a stepping motor (actuator) 18. In this embodiment, the vehicle further comprises actuators (not shown) for driving the automatic transmission 12 and the clutch 11, respectively.

The vehicle further comprises a controller 20. The controller 20 comprises a rotation detecting portion 20a shown in FIG. 2, and a motor control portion (not shown) for controlling the stepping motor 18, a transmission control portion (not shown) for controlling the actuator for the automatic transmission 12, and a clutch control portion (not shown) for controlling the actuator for the clutch 11.

The transmission control portion serves to change the gear position of the automatic transmission 12 in accordance with the speed of the vehicle. In accordance with information from the transmission control portion, the clutch control portion brings the clutch 11 into a disengaged condition immediately before the gear position is changed, and also brings the clutch 11 into an engaged condition immediately after the change of the gear position.

The vehicle includes an engine rotation sensor (main rotation sensor) 31 mounted on the output shaft 10a of the engine 10, an input shaft rotation sensor (auxiliary rotation sensor) 32 mounted on the input shaft 12a of the automatic transmission 12, and an output shaft rotation sensor (auxiliary rotation sensor) 33 mounted on the output shaft 12b of the automatic transmission 12. The rotation sensors 31, 32 and 33 are similar in construction. For example, each of these rotation sensors comprises a rotary member fixedly mounted on the corresponding shaft 10a, 12a, 12b and having one or more projections on its outer peripheral surface thereof, and an electromagnetic pickup disposed adjacent to the outer peripheral surface of the rotary member. With this construction, the electromagnetic pickup outputs one or more pulses per revolution of the shaft 10a, 12a, 12b. The rotation sensor 31, 32, 33 may be of any other suitable construction so long as it outputs pulses in accordance with the rotation of the shaft 10a, 12a, 12b. Also, these rotation sensors may be of the type which outputs a signal representative of the rotation of the shaft, instead of outputting the pulses. The engine rotation sensor 31 may be of the type which is mounted on a shaft always connected to the engine and outputs a signal in accordance with the rotation of this shaft.

Pulse signals Pe, Pi and Po outputted respectively from the rotation sensors 31, 32 and 33 are fed to the rotation detecting portion 20a of the controller 20.

The vehicle further comprises a clutch position sensor (connection condition detecting means) 35 for detecting the position of the clutch 11 or the stroke of the clutch 11, a gear position sensor (connection condition detecting means) 37 for detecting the gear position of the automatic transmission 12, and a potentiometer (operation condition detecting means) 36 for detecting the rotational position of the stepping motor 18. The clutch position sensor 35 outputs a signal C representative of the clutch position, and the gear position sensor 37 outputs a signal Gp representative of the gear position, and the potentiometer 36 outputs a voltage signal V representative of the rotational position of the stepping motor 18. These signals C, Gp and V are fed to the rotation detecting portion 20a of the controller 20.

Figure 2:
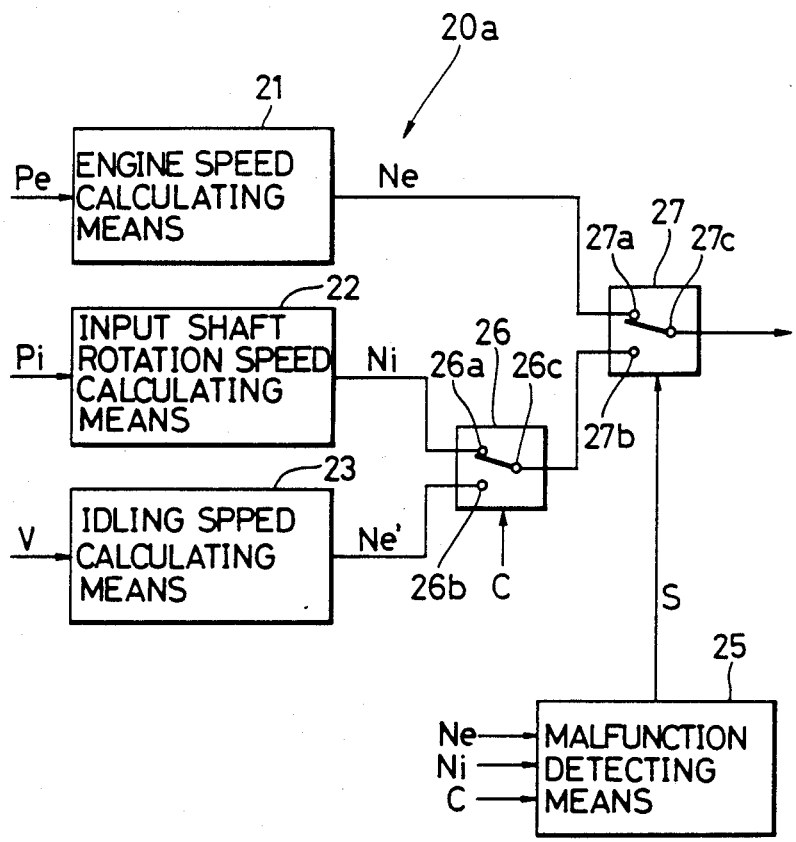
FIG. 2 is a block diagram of an engine speed detecting system of the present invention incorporated in a controller provided in the vehicle.

As shown in FIG. 2, the rotation detecting portion 20a of the controller 20 comprises an engine speed calculating means 21 for detecting the engine speed Ne in accordance with the pulse signal Pe from the engine rotation sensor 31, an input shaft rotation speed calculating means 22 for calculating the rotational speed Ni of the input shaft 12a of the automatic transmission 12 in accordance with the pulse signal Pi from the input shaft rotation sensor 32, and an output shaft rotation speed calculating means (not shown) for calculating the rotational speed No of the output shaft 12b of the automatic transmission 12 in accordance with the pulse signal Po from the output shaft rotation sensor 33.

FIG. 2 shows only the construction necessary for obtaining the engine speed (rotational speed) of the engine 10. The engine speed calculating means 21 serves as a main rotation speed calculating means for obtaining the engine speed, and the input shaft rotation speed calculating means 22 serves as a first back-up calculating means for obtaining the engine speed. However, the rotation sensors 32 and 33, the input shaft rotation speed calculating means 22 and the output shaft rotation speed calculating means are necessary for controlling the automatic transmission 12 and other associated parts, respectively, and therefore are also used to provide such necessary information independently of the calculation of the engine speed.

The rotation detecting portion 20a further comprises an idling speed calculating means 23. In accordance with the voltage signal V outputted from the potentiometer 36 and representing the rotational position of the stepping motor 18, the idling speed calculating means 23 calculates the engine speed Ne' obtained during the idling of the engine 10. When the engine is idling (that is, under no load) in the disengaged position of the clutch 11 or in the neutral position of the gear of the automatic transmission 12, the relation between the rotational position of the stepping motor 18 and the engine speed of the engine 10 is substantially linear. Therefore, the engine speed Ne' can be determined in accordance with the signal V from the potentiometer 36, using a predetermined formula or map.

The rotation detecting portion 20a further comprises a malfunction detecting means 25. The malfunction detecting means 25 serves to detect a malfunction of the engine rotation sensor 31. The engine speed Ne from the engine speed calculating means 21, the input shaft rotation speed Ni from the input shaft rotation speed calculating means 22 and the clutch position signal C are inputted into the malfunction detecting means 25. Then the clutch position signal C represents the engaged condition of the clutch 11 and at the same when the input shaft rotation speed Ni is not zero, the malfunction detecting means 25 judges that the engine speed sensor 31 is subjected to malfunction, if the engine speed Ne is zero. In this case, the malfunction detecting means 25 outputs a malfunction detecting signal S.

In the engaged condition of the clutch 11, when the pulse signal Pe is not outputted from the engine rotation sensor 31, and at the same time then the pulse signal Pi is outputted from the input shaft rotation sensor 32, the malfunction detecting means 25 may judge that the engine rotation sensor 31 is subjected to malfunction. Further, when the pulse signal Pe is not outputted from the engine rotation sensor 31, the malfunction detecting means 25 may judge that the engine speed sensor 31 is subjected to malfunction, even when a starter motor is rotated by an ignition key.

The rotation detecting portion 20a further comprises a first selection switch 26 and a second selection switch 27. One input contact 26a of the first selection switch 26 receives from the input shaft rotation speed calculating means 22 the signal representative of the input shaft rotation speed Ni, and the other input contact 26b receives from the idling speed calculating means 23 the signal representative of the engine speed Ne'. One input contact 27a of the second selection switch 27 receives from the engine speed calculating means 21 the signal representative of the engine speed Ne, and the other input contact 27b receives a signal fed from an output terminal 26c of the first selection switch 26. An output terminal 27c of the second selection switch 27 outputs a signal representative of the finally-determined engine speed.

The operation of the rotation detecting portion 20a will now be described. The first selection switch 26 is operated in response to the clutch position signal C, and the second selection switch 27 is operated in response to the malfunction detecting signal S. When the malfunction detecting means 25 does not output the malfunction detecting signal S, the output terminal 27c of the second selection switch 27 is connected to the one input contact 27a. As a result the engine speed Ne fed from the engine speed calculating means 21 is outputted from the output terminal 27c as the finally-determined engine speed.

When the malfunction detecting means 25 outputs the malfunction detecting signal S, the output terminal 27c of the second selection switch 27 is connected to the other input contact 27b. At this time, if the clutch position signal C from the clutch position sensor 35 is representative of the engaged condition of the clutch 11, the output terminal 26c of the first selection switch 26 is connected to the one input contact 26a. As a result, the input shaft rotation speed Ni fed from the input shaft rotation speed calculating means 22 is outputted from the output terminal 27c of the second selection switch 27 as the finally-determined engine speed.

If the clutch 11 is in the disengaged condition when the engine rotation sensor 31 is subjected to malfunction, the input shaft rotation speed Ni can not be used as back-up data. In this case, in response to the clutch position signal C representative of the clutch disengaged condition, the output terminal 26c of the first selection switch 26 is connected to the other input contact 26b. As a result, the engine speed Ne' fed from the idling engine speed calculating means 23 is outputted from the output terminal 27c of the second selection switch 27 as the finally-determined engine speed.

Thus, even when the engine rotation sensor 31 is subjected to malfunction, the actual engine speed of the engine 10 can be detected by using the signal Ni or the signal Ne' as back-up data.

When the clutch 11 is in the engaged condition, the engine speed Ne' is not significant at all, and does not represent the actual engine speed. Therefore, the engine speed Ne' and the input shaft rotation speed Ni serve as alternative back-up data, and are selectively used in accordance with the engaged and disengaged conditions of the clutch 11.

It is desirable from the viewpoint of efficiency that only when the engine rotation sensor 31 is subjected to malfunction and at the same time when the clutch 11 is in the disengaged condition, the idling speed calculating means 23 calculates the engine speed Ne'.

The controller 20 further comprises a calculating means (not shown) for calculating a target rotational position of the stepping motor 18, and a motor control means (not shown).

When the clutch 11 is in the engaged condition, the above target rotational position calculating means calculates the target rotational position corresponding to a signal outputted from a potentiometer (not shown) for detecting the position of an accelerator pedal. When the clutch 11 is brought into the disengaged condition so as to change the gear position of the automatic transmission 12, the target rotational position calculating means calculates the target rotational position of the stepping motor 18 so that the engine speed of the engine 10 can be brought into the desired level.

In accordance with a difference between the target rotational position of the stepping motor 18 and the actual rotational position thereof, the above motor control means determines a pattern of output of drive pulses, and outputs the drive pulses of this pattern to a drive circuit for the stepping motor 18.

Figure 3:
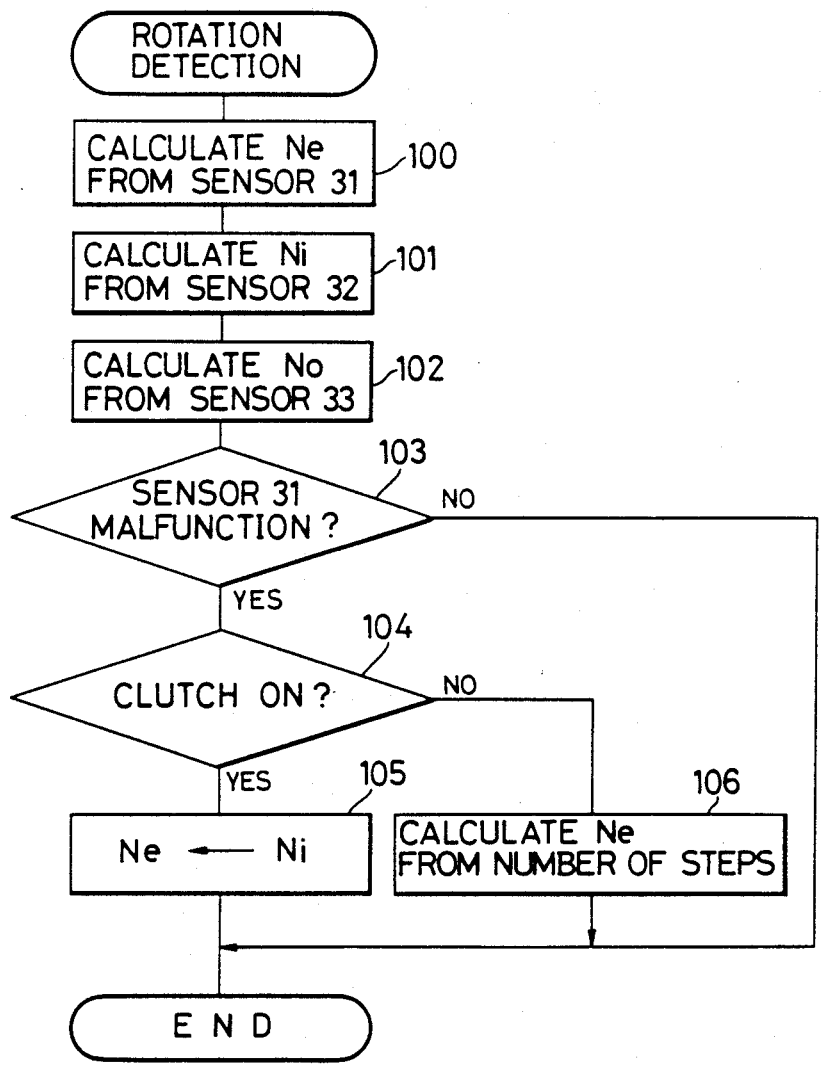
FIG. 3 is a flow chart of a routine executed by a microcomputer for detecting the engine speed.

The rotation detecting portion 20a of FIG. 2 can be composed of discrete electronic circuits, or can also be composed of a microcomputer. FIG. 3 shows a flow chart for a timer interrupt routine executed by a microcomputer for detecting the engine speed. More specifically, in Step 100, the engine speed (rotational speed) Ne of the engine 10 is calculated from the signal Pe from the engine rotation sensor 31. In the next Step 101, the rotational speed Ni of the input shaft 12a of the automatic transmission 12 is calculated from the signal Pi from the input shaft rotation sensor 32. In the next Step 102, the rotational speed No of the output shaft 12b of the automatic transmission 12 is calculated from the signal Po from the output shaft rotation sensor 33.

Then, in the manner described above, it is judged whether or not the engine rotation sensor 31 is subjected to malfunction. If it is decided that there is no malfunction, then this routine is finished. Therefore, in this case, the rotational speeds Ne, Ni and No calculated respectively in Steps 100 to 102 are used to control the stepping motor 18, the automatic transmission 12, etc.

If it is decided in Step 103 that there is a malfunction, the program proceeds to Step 104 in which it is judged whether or not the clutch 11 is in the engaged condition. If it is decided that the clutch 11 is in the engaged condition, the program proceeds to Step 105 in which the input shaft rotation speed Ni is determined to be used as the engine speed Ne. If it is decided in Step 104 that the clutch 11 is in the disengaged condition, the program proceeds to Step 106 in which the engine speed Ne of the engine 10 is calculated from the number of steps counting from the initial position of the stepping motor 18, that is, the rotational position of the stepping motor 18.

The number of steps of the stepping motor 18 are stored in a register by another timer interrupt routine for driving the stepping motor 18, and the engine speed Ne is calculated from the number of steps in accordance with a map or the like. Each time one drive pulse for rotating or angularly moving the stepping motor 18 in its normal direction (that is, in a direction to increase the amount of supply of the fuel to the engine 10) is outputted, the number of steps stored in the register is incremented by one. In contrast, each time one drive pulse for angularly moving the stepping motor 18 in its reverse direction is outputted, the number of steps stored in the register is decremented by one.

Figure 4:
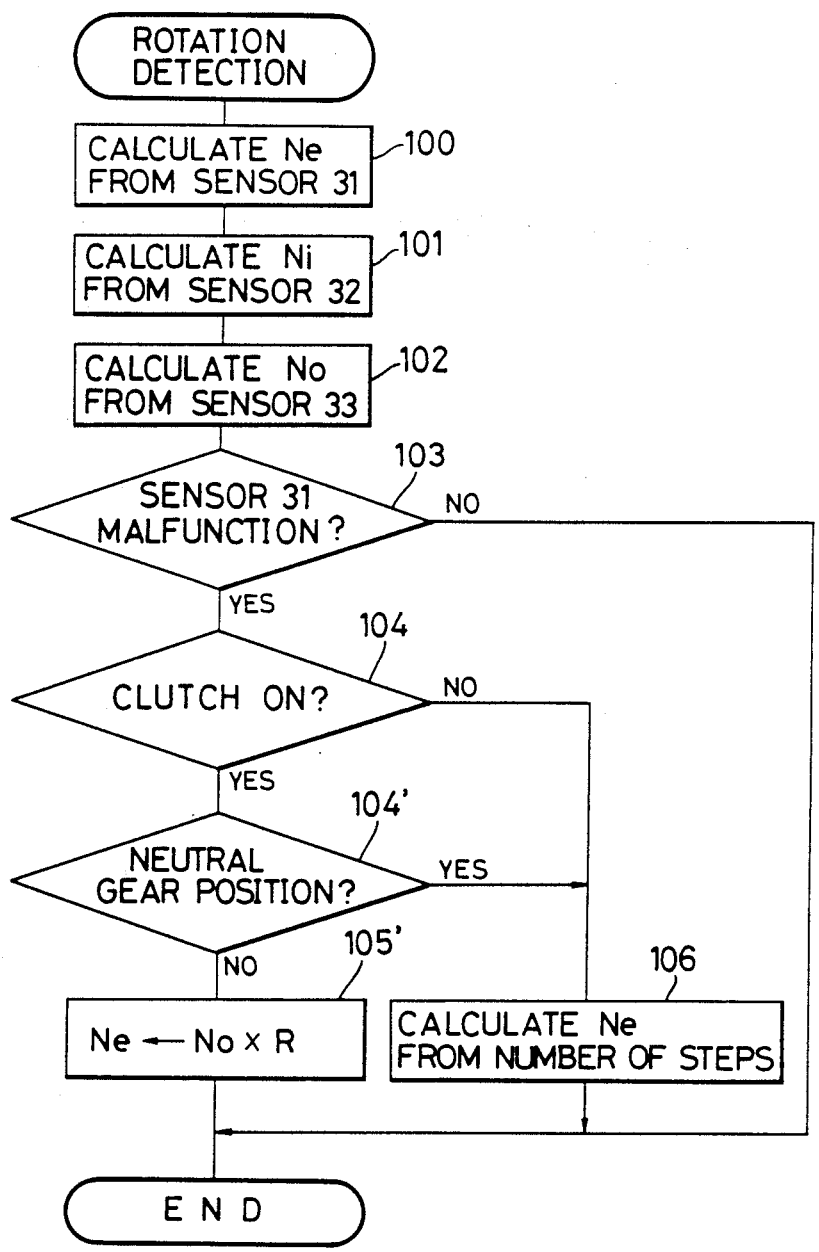
FIG. 4 is a flow chart of another routine for detecting the engine speed.

FIG. 4 shows a flow chart for a routine performed when instead of the input shaft rotation sensor 32, the output shaft rotation sensor 33 is used as the back-up rotation sensor. More specifically, Steps 100 to 104 of this routine are the same as those of the routine of FIG. 3. If it is decided in Step 104 that the clutch 11 is in the engaged condition, the program proceeds to Step 104' in which it is judged whether or not the gear position of the automatic transmission 12 is in the neutral position. If the gear position is not in the neutral position, the program proceeds to Step 105' in which the engine speed Ne is calculated by multiplying the output shaft rotation speed No by a gear ratio R. Here, the gear ratio R is determined by the gear position signal Gp from the gear position rotation sensor 37. If it is decided in Step 104 that the clutch 11 is in the disengaged condition, Step 106 which is the same as Step 106 of FIG. 3 is executed. Also, if it is decided in Step 104' that the gear position is in the neutral position, Step 106 is executed.

What is claimed is:

1. A system for detecting the speed of an engine for a vehicle, the vehicle comprising a clutch connected to an output shaft of the engine, a transmission connected to the clutch, wheels connected to the transmission, and an actuator for controlling the amount of supply of fuel to the engine, the vehicle including a power transmission device having an output side portion of the clutch and an input shaft and an output shaft of the transmission, said system comprising:
    (a) a main rotation sensor for outputting a signal in accordance with the operation of the engine;
    (b) an auxiliary rotation sensor for outputting a signal in accordance with the rotation of a portion of the power transmission device;
    (c) connection condition detecting means for determining whether or not the output shaft of the engine is connected to said portion of the power transmission device;
    (d) operation condition detecting means for detecting an operation condition of the actuator to output a signal representative thereof;
    (e) malfunction detecting means for detecting malfunction of said main rotation sensor;
    (f) main rotation speed calculating means for calculating the engine speed in accordance with the signal from said main rotation sensor;
    (g) first back-up calculating means for calculating the engine speed in accordance with the signal from said auxiliary rotation sensor, when said malfunction detecting means detects malfunction of said main rotation sensor, and said connecting condition detecting means determines that the output shaft of the engine is substantially connected to said portion of the power transmission device; and
    (h) second back-up calculating means for calculating the engine speed in accordance with the signal outputted from said operation condition detecting means and representing the condition of the operation of the actuator, when said malfunction detecting means detects malfunction of said main rotation sensor, and said connecting condition detecting means determines that the output shaft of the engine is substantially disconnected from said portion of the power transmission device.

2. A system according to claim 1, in which said auxiliary rotation sensor is mounted on the input shaft of the transmission so as to output the signal in accordance with the rotation of the input shaft, said connection condition detecting means including a clutch position sensor for detecting the position of the clutch, said first back-up calculating means calculating the rotational speed of the input shaft of the transmission in accordance with the signal from the auxiliary rotation sensor, and said rotational speed of said input shaft being used as the engine speed.

3. A system according to claim 1, in which said auxiliary rotation sensor is mounted on the output shaft of the transmission so as to output the signal in accordance with the rotation of the output shaft of the transmission, said connection condition detecting means including a clutch position sensor for detecting the position of the clutch, and a gear position sensor for detecting the position of a gear of the transmission, and said first back-up calculating means calculating the rotational speed of the output shaft of the transmission in accordance with the signal from said auxiliary rotation sensor, and further calculating the engine speed from said calculated rotational speed of the output shaft of the transmission and a gear ratio of the transmission.

4. A system to claim 1, in which the actuator includes a stepping motor, said operation condition detecting means substantially detecting the rotational position of said stepping motor.

* * * * *